Aug. 18, 1953

M. L. AUST 2,649,039

TRACTOR IMPLEMENT

Filed Jan. 17, 1949

Mart L. Aust
INVENTOR.

BY *Clarence A. O'Brien*
*and Harvey B. Jackson*
Attorneys

Mart L. Aust
INVENTOR.

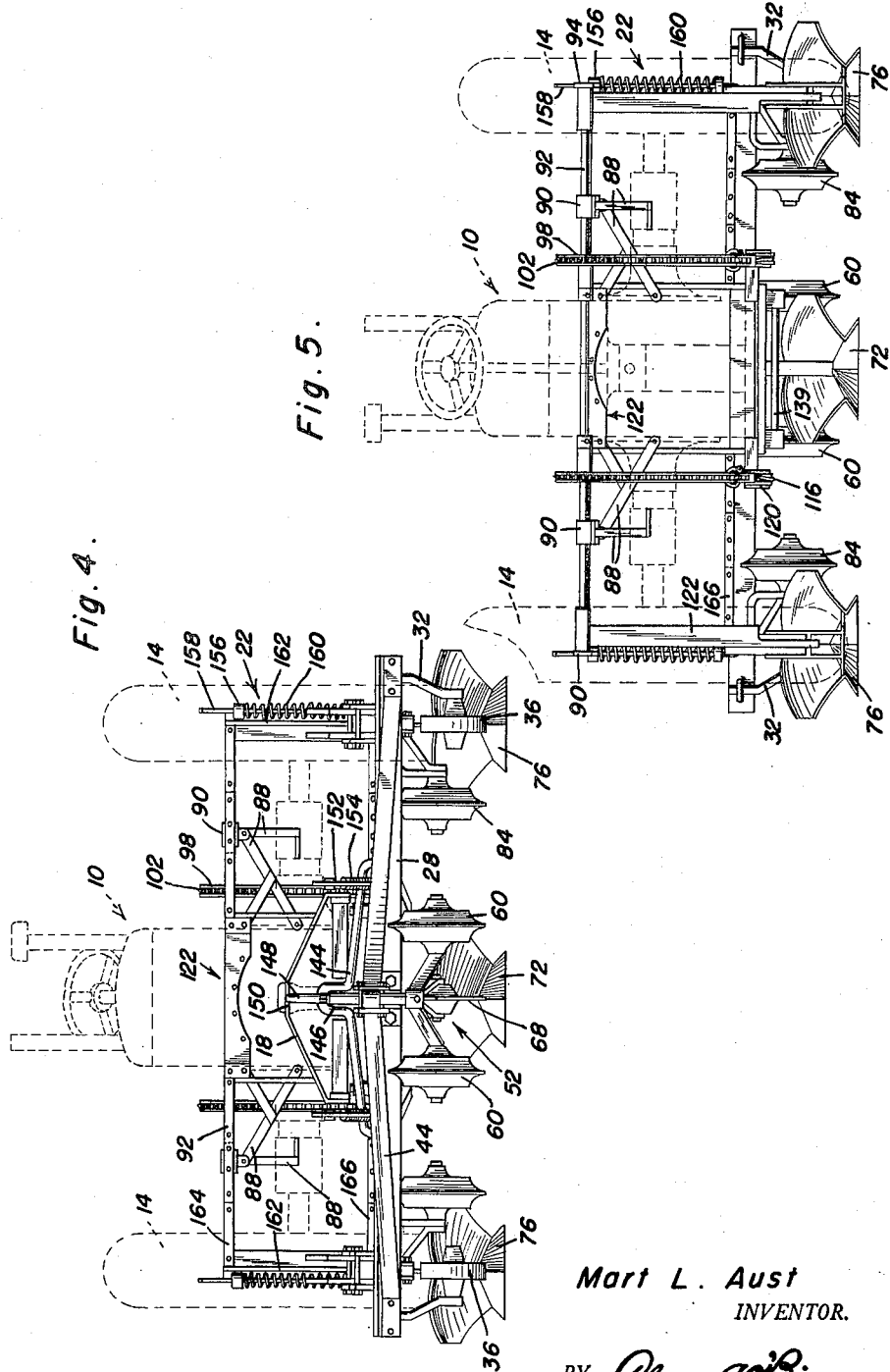

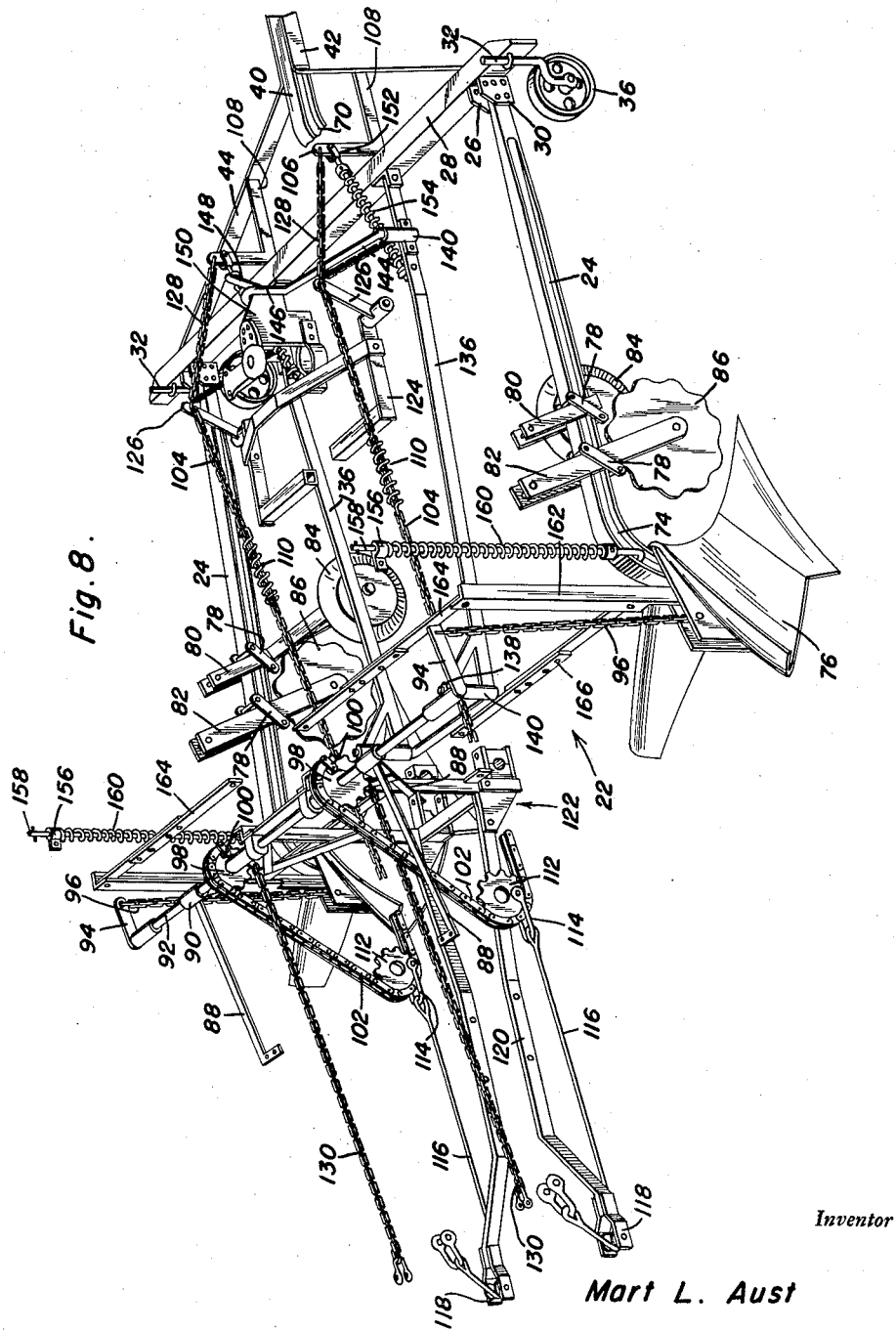

Patented Aug. 18, 1953

2,649,039

UNITED STATES PATENT OFFICE 2,649,039

TRACTOR IMPLEMENT

Mart L. Aust, Clarksdale, Miss.

Application January 17, 1949, Serial No. 71,326

15 Claims. (Cl. 97—46.43)

This invention relates to new and useful improvements in farm implements and the primary object of the present invention is to provide a full front mounted middle breaker including a plurality of coulters that are disposed forwardly of the wheels of a tractor to assure effective and necessary footing for all wheels of a tractor during its forward progress.

Another important object of the present invention is to provide a tractor implement including a wheeled frame embracing a tractor and forming a common support for a plurality of tools of breakers so that the said implement can be utilized for plowing or producing one, two or three rows.

Another object of the present invention is to provide a tractor implement including a wheeled frame, embracing a tractor, and swingably mounted thereto for vertical and horizontal movement and embodying novel and improved means connecting the frame to the steering mechanism of a tractor and retaining the frame in a substantially straight course with respect to the tractor during off-course movement of the tractor.

Another feature of the present invention is to provide a tool supporting frame so designed as to place the working load of the tools at the rear and strongest part of the tractor and to eliminate the variation of line of draft in plow when it is used as a two row middle breaker.

A further feature of the present invention is to provide a full front middle breaker including a wheeled frame swingably mounted on a tractor and supporting a plurality of tools, such as middle breakers with coulters, etc. and embodying novel and improved means connecting the frame to the lifting mechanism of a tractor so that the front plow may be raised and lowered ahead of the side or rear plows on the respective upward and downward strokes of the lifting mechanism.

A still further aim of the present invention is to provide a tractor implement that is simple and practical in construction, strong and reliable in use, substantially small and compact in structure, efficient and durable in operation, uniform in the work done, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a front elevational view of the device of Figure 1;

Figure 5 is a rear elevational view of the device of Figure 1;

Figure 6 is a fragmentary, longitudinal vertical sectional view taken substantially on the plane of section line 6—6 of Figure 3;

Figure 7 is a perspective view of the forward tool support and coulter attachment removed from the wheeled frame; and, Figure 8 is a fragmentary perspective view of the present invention.

Figure 1:
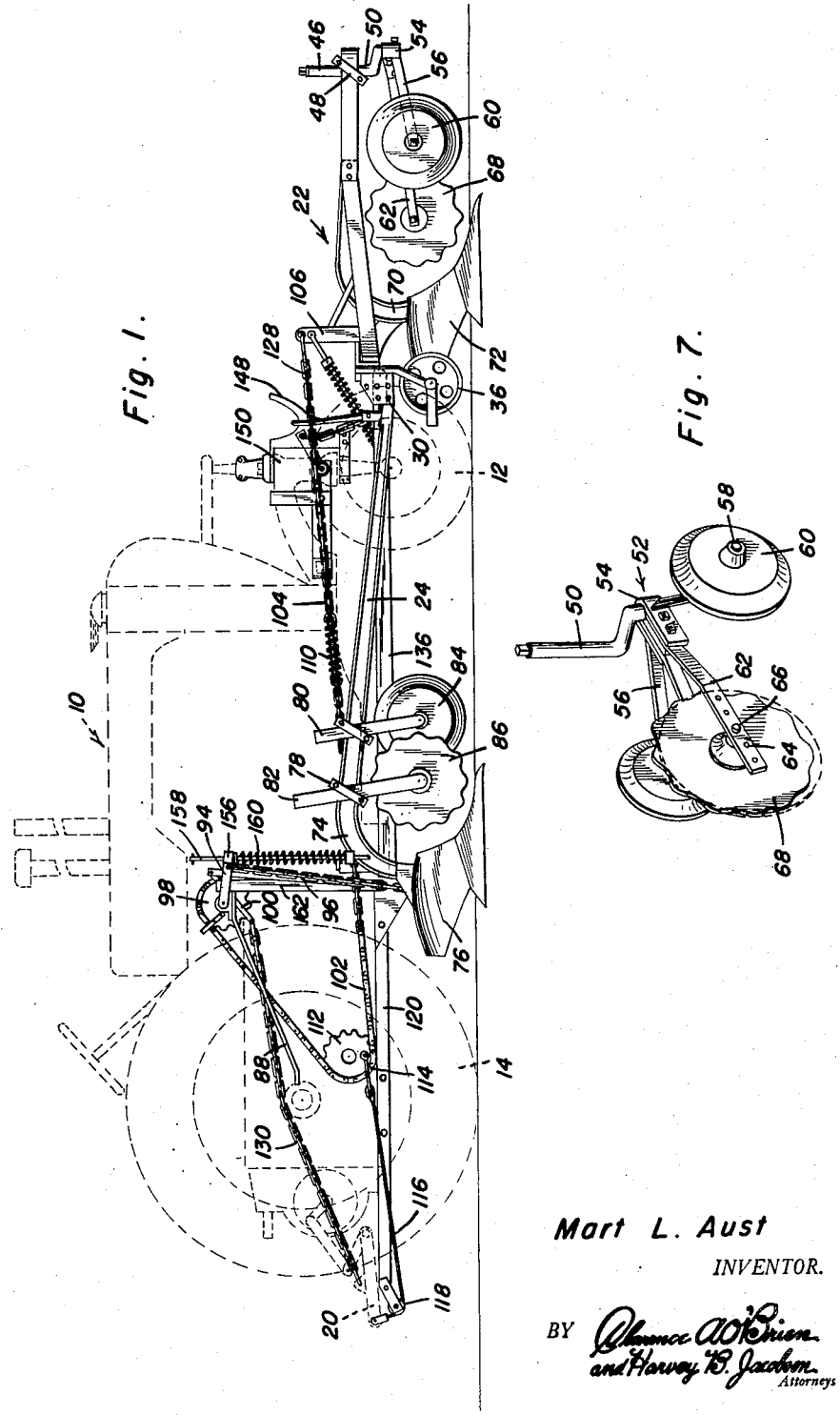
Figure 1 is a side elevational view of the present invention applied to a tractor (shown in dotted lines) and showing the frame in a lowered position.

Referring now to the drawings in detail, wherein for the purpose of illustration, there is disclosed a preferred embodiment of the present invention, the numeral 10 represents a tractor generally, having a forward pair of steerable wheels 12, a rear pair of wheels 14, a forwardly extending steering arm link 16 having a lateral projection or steering arm 18, and a pair of vertically movable lift arms 20 forming a lifting bail.

The present invention does not attempt to claim the above conventional and well known structure but is merely an attachment therefor that is raised and lowered by the lift arms 20 and which is moved to the left or right during actuation of the steering arm 18.

The numeral 22 represents a wheeled frame generally that embraces the tractor 10 and which includes a pair of spaced parallel side members or beams 24 the forward ends of which are pivotally and removably secured between pairs of perforated anchoring plates 26 projecting laterally from adjacent the ends of a forward, transverse beam 28, through the medium of suitable fasteners, such as 30.

Depending from the ends of the beam 28, is a pair of forward wheel supporting arms 32 the lower ends of which hold axles 34 for a pair of forward wheels 36.

Projecting from the central portion of the beam 28, is a pair of ears 38 between which the rear portion of a forward longitudinal beam 40 is secured. The forward end of the beam 40 is secured to the legs of a U-shaped supporting strap 42 and the ends of the strap 42 are provided with rearwardly and outwardly inclined extensions 44 that are suitably secured to the ends of the forward beam 28.

A vertically disposed filler or support 46 is mounted between the legs of the U-shaped member 42, by clamping plates 48, and supports a standard 50 to the lower end of which there is fixed a swingable forward wheel support which can be made rigid with a bolt through its lower portion. The support is designated generally by the numeral 52 in Figure 7. This wheel support 52 comprises a substantially U-shaped holding member 54 that supports a pair of downwardly and outwardly inclined arms 56 having free ends that carry axles 58 for a pair of forward double-beveled depth gauge wheels 60.

A pair of rearwardly extending tool retaining arms or straps 62 are adjustably secured to the member 54 by pairs of fasteners so that the same may be adjusted in a vertically inclined position and the free ends of the straps 62 are provided with a plurality of longitudinally spaced apertures 64 for selectively receiving an axle 66 on which there is mounted a forward coulter or tool 68 that is disposed forwardly of and between and forward of wheels 12 of the tractor, and forward of a plow or tool 72 to be later described.

The rear end of the beam 40 is provided with a downwardly curved extension 70 to which there is suitably fixed a plow or tool 72 that is interposed between the forward coulter 68 and the forward tractor wheels 12.

The rear ends of the side members 24 are also provided with downwardly curved extensions 74 that support a rear pair of plows or tools 76. The plows 76 are disposed forwardly of the rear wheels 14 and are of a width greater than the width of the wheels 14.

Slidably and adjustably mounted on each of the side members 24, by pairs of clamping plates 78, are pairs of standards 80 and 82 the lower ends of which support axles for a rear depth gauge wheel 84 and a rear coulter or tool 86, it being noted that the coulters 86 are forwardly and directly in front of the rear wheels 14 whereas the wheels 84 are spaced parallel to and inwardly from the coulters 86.

Suitably anchored to the rear axle housing and side of transmission housing of the tractor 10 is a plurality of forwardly extending arms 88 the free ends of which support bearings 90 for a transverse rockable shaft 92 having lateral projections 94 at the ends thereof. Link chains or connecting members 96 depend from the projections 94 and are secured to the rear tools 76 in a suitable manner.

A pair of spaced sprockets 98 are suitably keyed on the shaft 92 and receive the rear ends 100 of a pair of sprocket chains 102 the free forward ends of which are secured to link chains 104 that extend forwardly to arms 126. The forward ends of the link chains 104 are secured to swingable arms 126 (later to be described) and chains 104 include branch extensions 128 whose forward ends are attached to uprights 106 and whose rear and lower ends are attached to forward ends of members 136 (later described) carried by the beam 28 and the said uprights are braced to the extensions 44 by integral extensions 108.

Tensioning means in the form of coil springs 110 embrace portions of the chains 104 and the ends of the coil springs 110 are suitably secured to selected links of the chains 104 to prevent sagging of the chains 104, banging of the chains 104 against the tractor body, and these springs will also hold the cables 116 in sheaves 118.

Engaged with the sprocket chains 102 is a further pair of sprockets 112 to which links 114 are eccentrically mounted. The links 114 are connected to cables or the like 116 that are trained over the pulleys or sheaves 118 at the rear ends of a pair of elongated rear side members 120 that extend rearwardly from the supporting framework or rock shaft support designated generally by the numeral 122. The free rear portions of the cables 116 are coupled to the lift arms 20 so that as the lift arms 20 are swung upwardly, the sprockets 112 are pulled rearwardly and rotated downwardly due to the placement of the links 114, thereby pulling the chains 104 rearwardly to raise the extensions 44, beam 40, wheels 60, tool 68 and plow 72 first.

Figure 2:
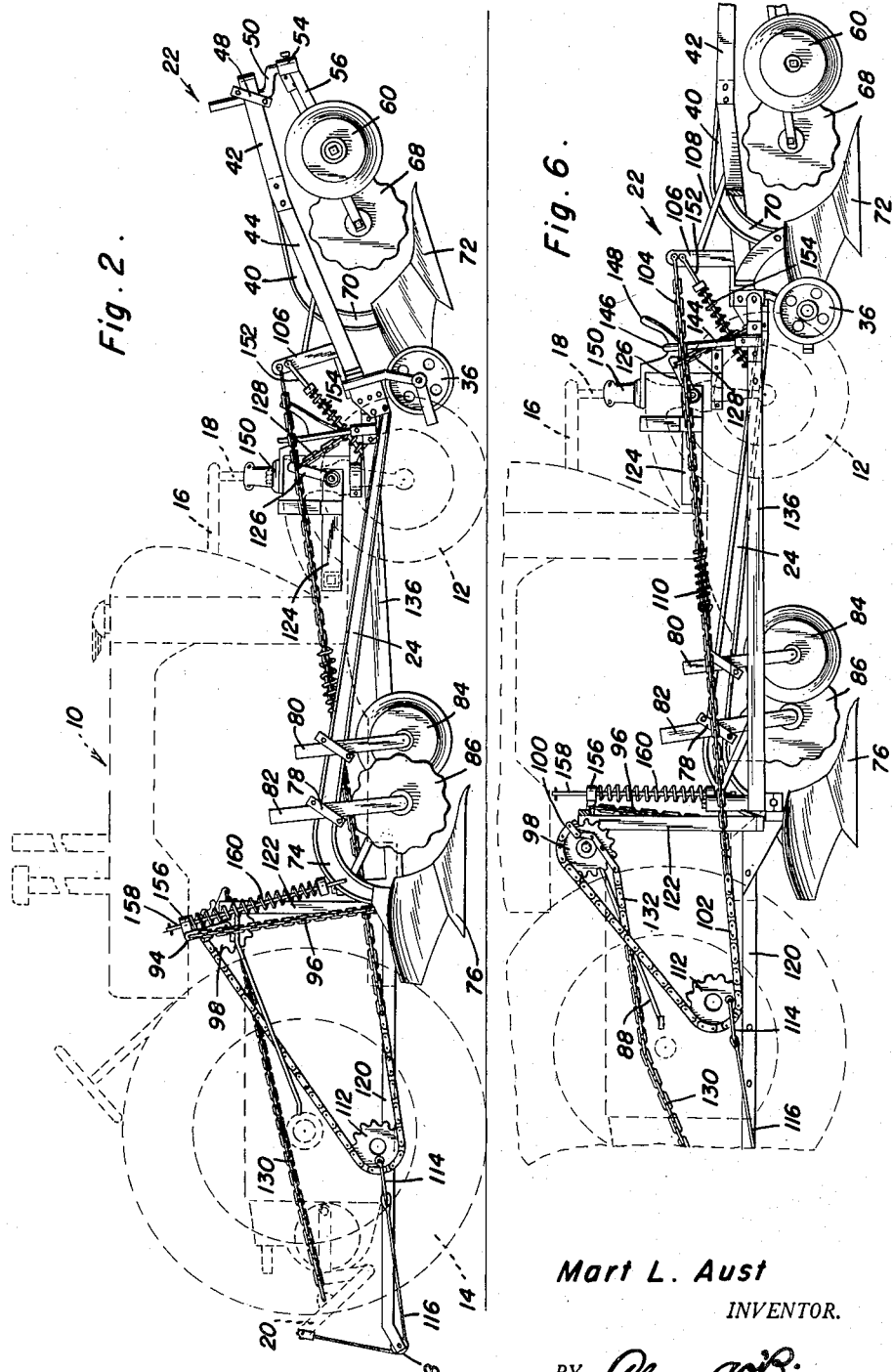
Figure 2 is a view similar to Figure 1 and showing the frame in a raised position.
Figure 3:
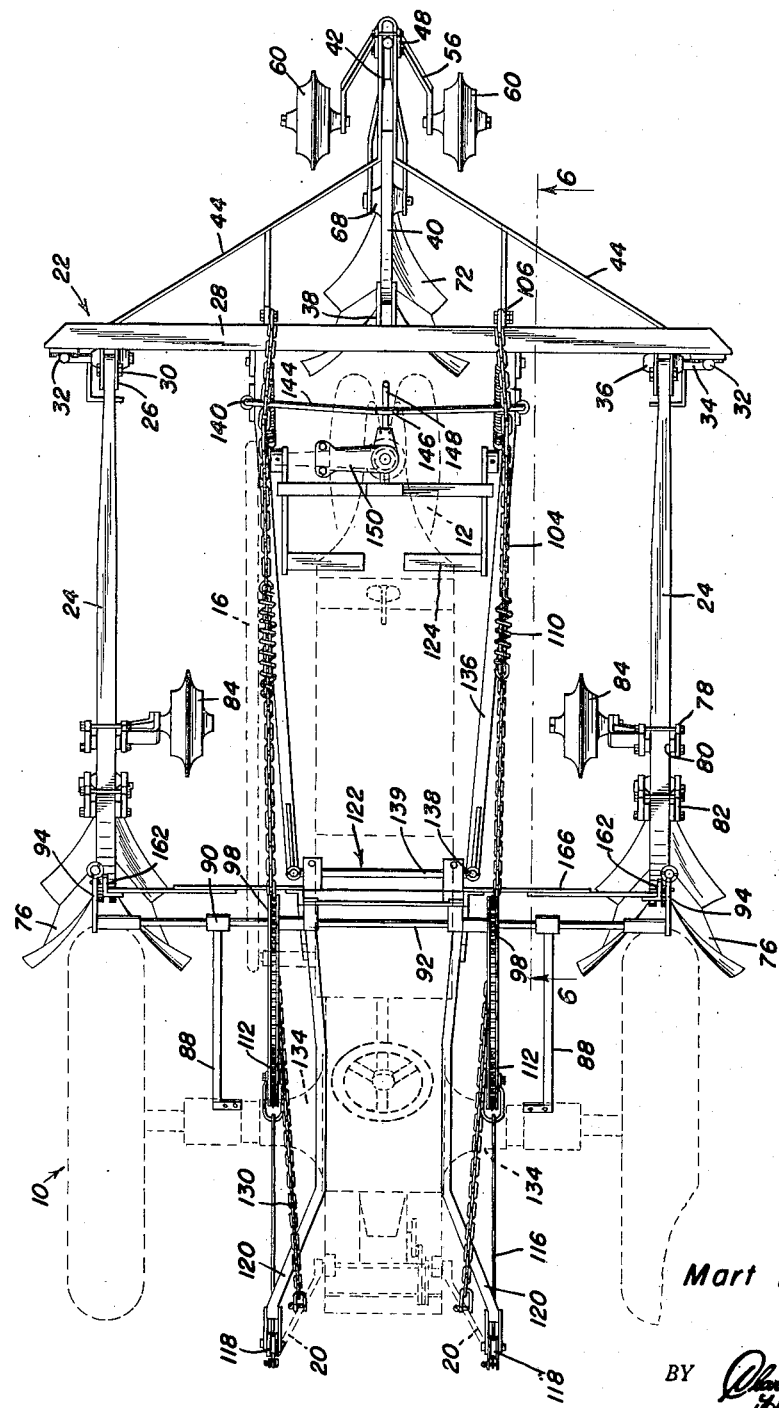
Figure 3 is a top plan view of the device of Figure 1.

To the forward portion of the tractor 10 there is secured a framework 124 that pivotally supports the aforementioned pair of vertically swingable cranks or arms 126. These arms 126 are anchored by the chains 128 to the uprights 106 of the forward beam 28 and are further connected to the chains 104 (as previously described) so that as the chains 104 are pulled rearwardly, the arms 126 will swing upwardly and rearwardly to thereby raise the beam 28 and the forward portions of the side members 136. The frame 22 is then disposed in the position illustrated in Figure 2 with the tools all raised above the ground. It being noted that the forward portion of the frame (beam 40) will be raised prior to the raising of the rear ends of the side members 24.

Means is provided for normally holding the sprockets 98 against rotation and the projections 94 substantially horizontal, and this means consists of a pair of chains 130 the rear ends of which are secured to the lift arms 20. The forward ends of the chains 130 are secured to the sprockets 98 by an arm or lever 100. The chains 130 normally rest on the rear axle housing 134 of the tractor and are taut when the frame 22 is in a lowered position (see Figs. 1 and 6). However, when the frame 22 is being raised the chains 130 will be moved to a substantially straight position (see Fig. 2) to permit rotation of the sprockets 98, shaft 92 and projection 94 for raising the rear portion of the beams 24.

Means is provided for steering the frame 22 in conjunction with the steering of the tractor and this means consists of a pair of elongated members 136 that are pivoted as at 138 to the vertically inclined push bar bail 139 mounted on the tractor 10 for horizontal and vertical swinging movement. The free ends of these members 136 are suitably pivotally secured to the beam 28 and support sleeves or bearings 140 that receive the downwardly extending leg portions of a steering fork 144.

The central portion of the fork 144 is provided with an inverted valley 146 that receives an arcuate finger 148 that projects laterally forward from the steering member 150 of the forward wheels 12 it being understood that the member 150 is connected to the steering arm 18.

As the steering arm 18 is actuated, the finger 148 will swing pushing the fork 144 and swing the frame 22 about the points 138 or more particularly the front ends of the side members 24, push bars 139 and beam 28.

Pitmans or links 152 connect the uprights 106 to the members 136 and coil springs 154 embrace the links 152 and bear against eye bolts pivotally securing the links to the members 136 for normally urging the beams 28 and 40 downwardly.

The projections 94 are provided with pivotal eyes 156 that slidably receive rods 158 pivoted on the side members 24. Coil springs 160 embrace the rods 158 and are biased between the eyes 156 and members 24 for urging the rear end of the members 24 carrying tools 76 downward. It should be noted, that the projections 94 are held stationary by chains 130 and arm or lever 100 when the frame 22 is in lowered or working position.

Rising from and suitably fixed to the tools 76, is a pair of standards or supporting posts 162 that support upper and lower groups of pivotally and adjustably connected stabilizer links 164 and 166 that are secured to the rockshaft support 122.

The linkage 164, 166 together with the standards 162 form a parallelogram that retains the beams 24, including plows 76, in a substantially vertical position so that the beams 24 may be spaced apart a predetermined distance.

Having described the invention, what is claimed as new is:

1. In a tractor including forward and rear ends and a power lift at its rear end, a farm implement comprising a transverse tool supporting beam disposed in front of the tractor, a pair of side beams disposed longitudinally of the tractor and at the sides thereof, said side beams being pivoted at their forward ends to said transverse beam for vertical swinging movement, posts rising from the rear ends of said side beams, vertically swingable links connecting the posts to the rear end of the tractor, a support mounted on the rear end of the tractor, a rock shaft disposed transversely of the tractor and supported by said support, said rock shaft being connected to the rear ends of the side beams for raising the rear ends of the side beams during rocking of the shaft in one direction and for lowering the rear ends of the side beams during rocking of the shaft in the opposite direction, tools mounted on the rear ends of the side beams, and means operatively connecting the rock shaft and the transverse beam to the power lift for sequentially pivoting the transverse beam upwardly and rearwardly and for rotating the rock shaft to raise the rear ends of the side beams, whereby tools carried by said transverse beam will be raised prior to tools mounted on said side beams.

2. The combination of claim 1 and means forming a connection between the rear ends of said side beams and said rock shaft for yieldingly urging the rear ends of said side beams downwardly relative to said rock shaft.

3. The combination of claim 1 and a longitudinal beam having a rear end portion rigidly attached to said transverse beam, and tools carried by said longitudinal beam and disposed immediately in front of the tractor.

4. In a tractor including lift arms, a farm implement mounted on the tractor and comprising a transverse beam, a pair of longitudinally extending tool supporting beams having forward and rear ends, horizontal pivots securing the forward ends of said side beams to said transverse beam, a forward longitudinal beam having a rear end rigidly attached to said transverse beam, tools carried by said forward beam, and means connecting the transverse beam and the rear ends of the longitudinally extending beams to the lift arms for sequentially moving the transverse beam upwardly and rearwardly about said pivots and the rear ends of said longitudinally extending beams about said pivots, whereby said tools carried by said forward beam will be raised prior to tools carried by the rear ends of the longitudinally extending beams.

5. The combination of claim 4 and ground wheels supported on said transverse beam.

6. In a tractor including a power lift, a steering member, a vertically swingable bar bail and forward and rear ends, an agricultural implement comprising a wheeled frame including a transverse beam disposed forwardly of the tractor, ground wheels carried by said transverse beam, a pair of longitudinal side beams disposed at opposite sides of the tractor and having forward and rear ends, horizontal pivots securing the forward ends of said side beams to the transverse beam, a forward longitudinal beam having a rear end rigidly attached to said transverse beam, tools carried by said forward beam, additional tools carried by the rear ends of said side beams, brace and support means connecting the bar bail to the transverse beam, means carried by said brace and support means and engaged with said steering member for swinging the transverse beam in response to turning of the steering member, and means operatively connecting said transverse beam and the rear ends of said side beams to said power lift for sequentially moving the transverse beam forwardly and upwardly about said pivots and raising the rear ends of said side beams about said pivots whereby the tools carried by said forward beam will be raised prior to the tools carried by the rear ends of said side beams.

7. The combination of claim 6 and means attached to said brace and support means and exerting a force on said transverse beam and yieldingly urging said forward beam toward the ground over which the tractor is moving.

8. The combination of claim 7 wherein said means for sequentially moving the transverse beam and said side beams about said pivots includes a support mounted at the rear end of the tractor, a horizontal rock shaft journaled for rotation on said support and disposed transversely of the tractor, arms projecting laterally from the ends of said shaft, and flexible members terminally secured to said arms and said side beams.

9. In a tractor having a bar bail, a steering member and a lift means, an agricultural implement comprising a transverse beam disposed in front of and transversely of the tractor, ground wheels supporting said transverse beam, a pair of side beams having forward and rear ends, said transverse beam being pivoted to the forward ends of said side beams for pivotal movement about a horizontal axis, a forward beam having a rear end rigidly attached to said transverse beam intermediate the ends of said transverse beam, means connecting said bar bail to said transverse beam, a transverse fork carried by said connecting means and engaged with said steering member for moving the transverse beam in response to turning of the steering member, and means operatively connecting said transverse beam and the rear ends of said side beams to the lift means of the tractor for sequentially pivoting the transverse beam forwardly and upwardly about said horizontal axis and raising the rear ends of the side beams about said horizontal axis.

10. For use with a tractor having a lift means, a farm implement comprising a transverse beam, a pair of side beams having forward and rear ends, the forward ends of said side beams being pivoted to said transverse beam, ground wheels depending from said transverse beam, a forward longitudinal beam having a rear end rigidly attached to said transverse beam, tools carried by said forward beam, additional tools carried by the rear ends of the side beams, and means operatively connecting the transverse beam and the rear ends of said side beams to said lift means and sequentially pivoting the transverse beam forwardly and upwardly and raising the rear ends of the side beams, whereby the tools carried by said forward beam will be raised prior to the raising of the tools carried by the side beams.

11. In a tractor including a lift means and a vertically swingable bar bail, an agricultural implement comprising a transverse beam disposed in front of the tractor, ground wheels on said beam, a forward tool supporting beam fixed to said transverse beam, a pair of side beams pivoted to said transverse beam and attached to the tractor, connecting and bracing members mounted on said bar bail and pivoted to said transverse beam, and means operatively connecting the transverse beam to the lift means for pivoting the transverse beam to raise the tool supporting beam.

12. In a tractor having a bar bail thereon, an agricultural implement comprising a pair of side members attached to the tractor, a forward member extending across said side members and mounted for pivotal movement on the side members, means connecting and bracing the forward member to the bar bail, a longitudinal tool supporting beam attached to said forward member, and means mounted on the tractor and connected to the forward member for pivoting the forward member to selectively raise and lower the tool supporting beam.

13. An agricultural implement comprising a pair of side beams having tools mounted thereon, a transverse beam pivoted on said side beams for pivotal movement about a horizontal axis, a longitudinal beam attached to and projecting laterally from said transverse beam and having tools mounted thereon, supporting and bracing members pivoted to said transverse beam, means forming a connection between said transverse beam and said members restricting pivotal movement of said transverse beam about the said horizontal axis, a support, means connected to and retaining said side beams spaced from the support, means engaged with the support and connected to said transverse beam for pivoting the transverse beam about the horizontal axis and also connected to said side beams for selectively raising and lowering the side beams.

14. The combination of claim 13 and vertical sleeves fixed to and rising from said supporting and bracing members, and a steering yoke having end portions journaled for rotation in said sleeves.

15. An agricultural implement comprising a transverse beam, a pair of elongated side beams having forward and rear ends, horizontal pivot means securing the forward ends of the side beams to the transverse beam for pivotal movement of the transverse beam about a horizontal axis, a forward beam attached to said transverse beam, tools mounted on said forward beam, additional tools mounted on the rear end of said side beams, bracing and connecting members pivoted to said transverse beam, a steering means attached to said members, a support, a horizontal shaft journaled for rotation on said support and connected to the rear ends of said side beams for selectively raising and lowering the rear ends of the side beams upon rotation of the shaft, and means connected to said shaft and to said transverse beam for rotating the shaft and for pivoting the transverse beam about said horizontal axis.

MART L. AUST.

References Cited in the file of this patent
UNITED STATES PATENTS

| Number | Name | Date |
|---|---|---|
| 1,402,880 | Merriman | Jan. 10, 1922 |
| 1,677,505 | Thomson | July 17, 1928 |
| 1,870,740 | Leiter | Aug. 9, 1932 |
| 2,050,424 | Davis | Aug. 11, 1936 |
| 2,164,543 | Peacock | July 4, 1939 |
| 2,171,830 | Hayes | Sept. 5, 1939 |
| 2,179,793 | Lewison | Nov. 14, 1939 |
| 2,321,464 | Cook | June 8, 1943 |